United States Patent [19]

Tang et al.

[11] Patent Number: 5,262,904
[45] Date of Patent: Nov. 16, 1993

[54] METHOD AND APPARATUS FOR MEASURING AND COMPENSATING NONLINEAR BITSHIFT

[75] Inventors: Yaw S. Tang, Satatoga; Ching H. Tsang, Sunnyvale, both of Calif.

[73] Assignee: International Business Machines Corporation, Armonk, N.Y.

[21] Appl. No.: 643,975

[22] Filed: Jan. 22, 1991

[51] Int. Cl.$^5$ ............................................. G11B 5/09
[52] U.S. Cl. ....................................... 360/45; 360/40; 360/48
[58] Field of Search ............... 360/45, 40, 48; 341/52, 341/53, 54, 64

[56] References Cited

U.S. PATENT DOCUMENTS

| | | | |
|---|---|---|---|
| 3,686,682 | 8/1972 | Behr et al. | 340/174.1 |
| 4,009,490 | 2/1977 | Fassbender | 360/45 |
| 4,142,215 | 2/1979 | Roberts | 360/31 |
| 4,167,761 | 9/1979 | Best | 360/45 |
| 4,230,799 | 5/1980 | Price | 360/40 |
| 4,251,882 | 2/1981 | Pfefferkorn | 371/28 |
| 4,276,573 | 6/1981 | Halpern et al. | 360/45 |
| 4,327,383 | 4/1982 | Holt | 360/45 |
| 4,612,586 | 9/1986 | Sordello et al. | 360/45 |
| 4,764,915 | 8/1988 | Efron et al. | 369/58 |
| 4,796,109 | 1/1989 | Sordello et al. | 360/45 |
| 5,068,754 | 11/1991 | Garde | 360/45 |

OTHER PUBLICATIONS

G. H. Sonu, "Dropout-Error-Rate Calculations for Maximum-Density Study", IEEE Transactions on Magnetics, vol. MAG-21, No. 5, Sep. 1985, pp. 1392–1394.

C. M. Melas et al., "Nonlinear Superposition in Saturation Recording of Disk Media", IEEE Transactions on Magnetics, vol. MAG-23, No. 5, Sep. 1987, pp. 2079–2081.

D. Palmer et al., "Identification of Nonlinear Writhe Effects Using Pseudorandom Sequences", IEEE Transactions, on Magnetics, vol. MAG-23, No. 5, pp. 2377–2379, Sep. 1987.

R. Herman, "Volterra Modeling of Digital Magnetic Saturation Recording Channels" IEEE Transactions on Magnetics, vol. 26, No. 5, Sep. 1990, pp. 2125–2127.

*Primary Examiner*—Robert J. Pascal
*Assistant Examiner*—Tan Dinh
*Attorney, Agent, or Firm*—David J. Kappos

[57] ABSTRACT

A method and device for use in measurement and compensation of nonlinear bitshift in nonlinear communication media such as magnetic and optical recording devices. The method and device are based on special bit patterns constructed to eliminate at least one harmonic of the fundamental frequency of the data pattern if all bits are communicated without any nonlinear bitshift. The presence of nonlinear bitshift is manifested by the appearance of the harmonic. By measuring the magnitude of the harmonic, the amount of nonlinear bitshift is determined, and compensation adjustment is then used to offset its effect on the data detection scheme.

29 Claims, 3 Drawing Sheets

NONLINEAR BITSHIFT COMPENSATOR

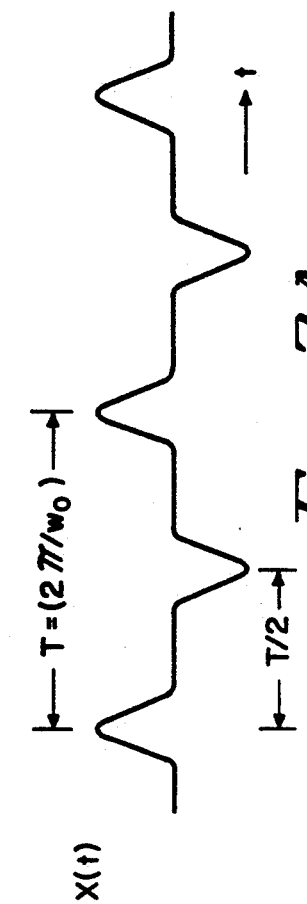
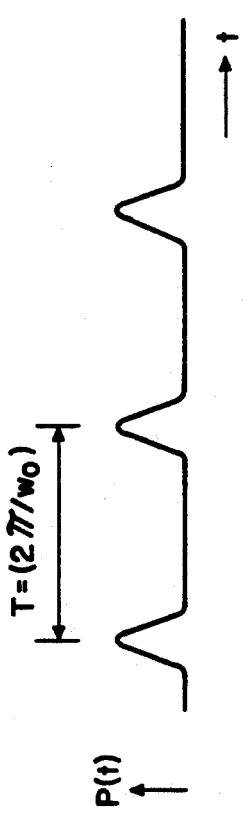
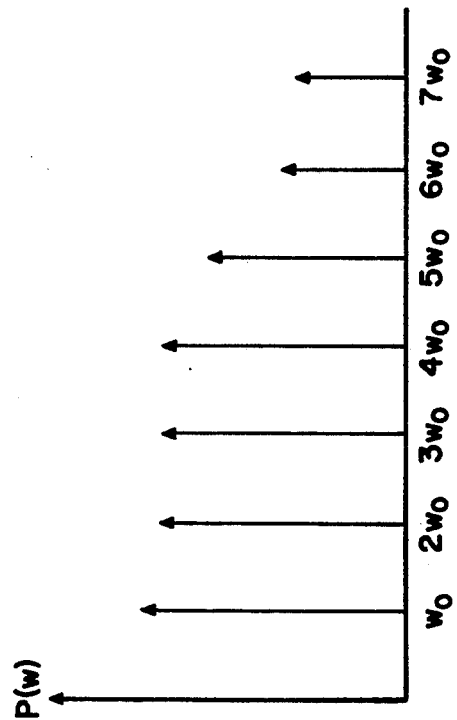

PRML RECORDED DATA DETECTION SCHEME
WITH COMPENSATION

METHOD AND APPARATUS FOR MEASURING AND COMPENSATING NONLINEAR BITSHIFT

This invention relates in general to nonlinear communication media and in particular to READ/WRITE data channels in magnetic and optical data recording devices.

BACKGROUND OF THE INVENTION

It is well known that when recording closely spaced data bits (such as dibits) on a nonlinear communication medium (for example, writing to a magnetic disk or an optical disk) the position of the bits may be shifted. This shift (which is called nonlinear bitshift) degrades the performance of known data detection schemes such as the PRML (partial-response-maximum-likelihood) detection scheme, since these detection schemes are based on the assumption of a linear channel response.

It is possible to compensate the nonlinear bitshift effect by shifting the data bit positions during data writing. However, to design a compensation scheme, the magnitude of the nonlinear bitshift must be known. Unfortunately, measuring the nonlinear bitshift has proven difficult; the prior art has accomplished such measurement only by means of sophisticated and expensive equipment.

Several methods requiring such equipment have been proposed for measuring nonlinear bitshift. One is to compare the data bit response with isolated transitions to identify the nonlinear bitshift. A second uses a specially designed pseudo-random sequence to determine an impulse response. The nonlinear bitshift is then measured as an echo at a known position. A third uses a Volterra modelling technique for characterizing nonlinear distortion in magnetic recording channels. All these methods require complicated data manipulation and high precision waveform recording. Thus, all are complex and costly when used to provide routine measurement of nonlinear bitshift such as that required in a manufacturing or operational environment.

OBJECTS OF THE INVENTION

It is therefore an object of the present invention to provide a data recording device having compensation for nonlinear bitshift.

It is another object of the present invention to provide a system for performing nonlinear bitshift compensation in a data recording device during manufacturing and operation.

It is another object of the present invention to provide a method for measuring magnitude and direction of nonlinear bitshift in a data recording device.

It is another object of the present invention to provide a binary data pattern having at least one harmonic eliminated.

These and other objects will become more apparent when read in light of the following specification and drawings.

SUMMARY OF THE INVENTION

In accordance with the invention, a data recording device is provided with a system which measures and compensates nonlinear bitshift. The system is based on the use of special complex data patterns. These data patterns have in common the property that when their data bits, or pulses, are written without nonlinear bitshift, certain harmonics of the fundamental frequency of the chosen data pattern are nulled, or eliminated (i.e., they have zero amplitude). However, if some data pulses are shifted due to nonlinear bitshift, the "eliminated" harmonics reappear and exhibit nonzero amplitude. The amplitudes of these harmonics are indicative of the magnitude of the nonlinear bitshift. Once the magnitude of the nonlinear bitshift is known, an offsetting adjustment is applied to the data recording device to eliminate its effect.

The complex data patterns created according to the present invention have two principal features. First, the patterns are generated so that they incorporate within themselves the particular bit environment (such as a dibit) for which nonlinear bitshift is to be determined and eliminated. This feature allows application of the invention to relatively simple data patterns frequently encountered in the course of data transmissions. Second, the patterns can be made insensitive to sources of nonlinear effects other than nonlinear bitshift. This feature enables extraneous nonlinear effects to be factored out of the nonlinear bitshift elimination scheme.

In accordance with the present invention, two alternative embodiments are provided for using the harmonic nulling patterns to eliminate nonlinear bitshift from data streams. The first embodiment uses an empirical approach, placing a problematic bit pattern in a harmonic nulling data pattern, iteratively minimizing the amplitude of the "eliminated" harmonic by shifting relative to one another the bits comprising the problematic bit pattern, and then storing the best fit bit spacing for later use in pre-shifting data patterns to compensate for the expected nonlinear bitshift. The second embodiment uses an analytical approach which applies in the case of a dibit recorded on a magnetic storage device, placing a dibit pattern in a harmonic nulling data pattern, determining the amount and direction of bitshift associated with the "eliminated" harmonic corresponding to the bit spacing of the dibit, then varying the spacing of the dibit, forming a new harmonic nulling data pattern, and repeating the determining step to form a compensation plot for later use in pre-shifting data patterns to compensate for the expected nonlinear bitshift.

BRIEF DESCRIPTION OF THE DRAWINGS

FIG. 1a,b) is a graphical representation illustrating a periodic pulse train and its harmonics.

FIG. 2(a,b) is a graphical representation illustrating a symmetric pulse train and its harmonics.

DETAILED DESCRIPTION OF THE INVENTION

I. Development of Harmonic Nulling Data Patterns and Determination of Nonlinear Bitshift In order to appreciate the specific aspects of the invention as applied to a data recording device, it is helpful to understand the signal processing fundamentals underlying generation of harmonic nulling data patterns and determination of nonlinear bitshift. The following description explains these signal processing fundamentals and the relationships derived from them that form a part of the present invention.

FIGS. 1(a) and 1(b) illustrate in the time domain and the frequency domain, respectively, frequency components at integer multiples of $w_o$, where $w_o = 2\pi/T$ is the fundamental frequency, P(t) represents the pulse train, and P(w) represents its frequency components.

A more complicated periodic data pattern can be viewed as sums of delayed pulses from FIG. 1(a). FIG. 2(a) illustrates a series of equally spaced transitions, in which a symmetric pulse train has a spectrum as represented by the illustration in FIG. 2(b), wherein $$X(w) = P(w)(1 - e^{-jwT/2}) \quad (1)$$

When w is an even harmonic of $w_o$, $e^{-jwT/2}$ is unity, and X(w) vanishes regardless of the magnitude of P.

Figure 3A:
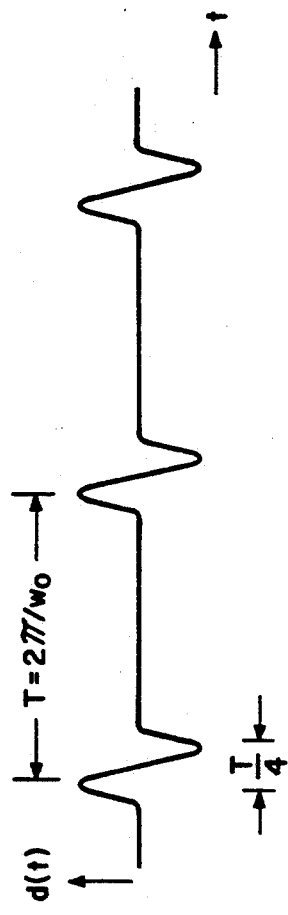
FIG. 3(a,b) is a graphical representation illustrating a dibit pulse train and its harmonics.
Figure 3B:
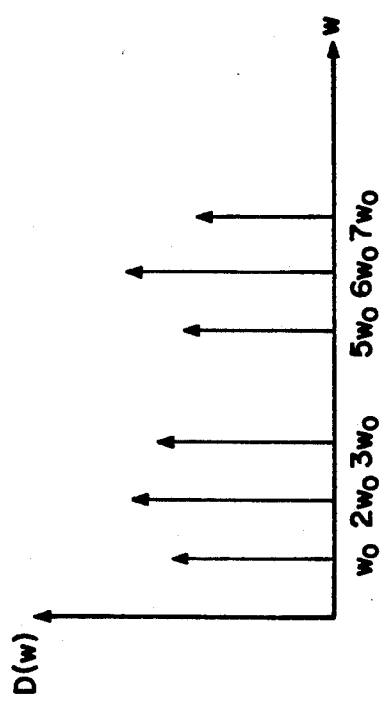

FIG. 3(a) shows an example of a periodic data pattern known as a dibit sequence. The spacing between the two bits in each dibit is T/4. The spectrum of the dibit sequence is illustrated in FIG. 3(b), wherein $$D(w) = P(w)(1 - e^{-jwT/4}) \quad (2)$$

In this case, the 4th, 8th, . . . 4nth harmonics will vanish.

In general, the spectrum of a given periodic data pattern can be expressed as:

$$Y(w) = P(w)(1 + a_2 e^{-jwT2} a_3 e^{-jwT3} \ldots + a_N e^{-jwTN}) \quad (3)$$

where $a_n = +1$ or $-1$, representing the polarity of the pulse, $T_2 < T_3 < \ldots < T_N$ and $T_2 \ldots T_N$ represent the time distances between the first pulse and the 2nd, the 3rd, ... the N-th pulse in the pattern. Various harmonics of the fundamental frequency may be eliminated by choosing $T_2 \ldots T_N$ so that Y(w) vanishes, as illustrated by the above examples. In this case the above general expression takes on the form:

$$1 + a_2 e^{-jwT2} a_3 e^{-jwT3} \ldots + a_N e^{-jwTN} = 0 \quad (4)$$

or $$1 + \Sigma_{n=2}^{N} a_n e^{-jwTn} = 0 \quad (5)$$

where n runs from 2 to some chosen limit N and w is the frequency at which the value of function Y in equation (8) is zero. It should be noted that many harmonic eliminating patterns are possible.

In the case where the recording medium is a magnetic storage device, the alternating polarity of the data pulses dictates alternating values for $a_n$, and equations (3), (4) and (5) become, respectively, $$Y(w) = P(w)(1 - e^{-jwT2} + e^{-jwT3} - \ldots - (-1)^N e^{-jwTN}) \quad (6)$$

$$1 - e^{-jwT2} + e^{jwT3} - \ldots - (-1)^N e^{-jwTN} = 0 \quad (7)$$

and $$1 + \Sigma_{n=2}^{N}(-1)^{n+1} e^{-jwTn} = 0 \quad (8)$$

The general process for creating a data pattern having a nulled harmonic is as follows. A bit pattern is chosen, the bit pattern having $N \geq 2$, a user specified frequency w, and containing the bit environment (such as a dibit) for which it is desired to determine nonlinear bitshift. The bit time spacings of this pattern is designated to be $T_2 \ldots T_N$, which in general are subject to a number of constraints due to the chosen bit environment and possible limitations on the ability to place transitions in specific locations, as would be readily appreciated by one of skill in the art. Then equation (8) is solved for $T_2 \ldots T_N$ to yield the spacings necessary to achieve a spectral null. Due to the constraints $T_2 \ldots T_N$, equation (8) may or may not be solvable. If not, an extra bit ($T_{N+1}$) is added to the original pattern, and equation (8) is again solved for $T_2 \ldots T_{N+1}$. The process is repeated until enough bits are added to render the constraints compatible with equation (8). Finally, once an acceptable pattern is created, it is checked against other nonlinear effects, such as hard transition shifts, positive/negative WRITE current asymmetry, and magnetoresistive head positive/negative READ asymmetry. If the pattern is found to be susceptible to any of these extraneous nonlinear effects, it may be further modified by adding additional bits and again solving equation (8) for the bit time spacings.

II. Use of Harmonic Nulling Data Patterns to Eliminate Nonlinear Bitshift

In accordance with the present invention, two alternative schemes are provided for exploiting the harmonic nulling patterns to eliminate the nonlinear bitshift effect. First, using an empirical approach, a measurement mode is provided wherein a problematic bit pattern (such as closely spaced dibit) is placed in a harmonic nulling data pattern and the test pattern thus formed is recorded on the data recording device. The amplitude of the "eliminated" harmonic is measured. Then the bits comprising the problematic pattern are shifted relative to one another and the amplitude of the "eliminated" harmonic is re-measured. The process is repeated until the amplitude of the "eliminated" harmonic is reduced to a tolerable level (or zero). The original spacing of the problematic bit pattern and the input bit pattern spacing necessary to achieve it are saved. Another problematic bit pattern spacing may then be chosen and its corresponding input bit pattern spacing determined, and so on until a correction table of problematic bit pattern spacings and corresponding input bit pattern spacings is formed.

When the measurement mode is thus completed, a compensation mode is provided wherein problematic patterns in a complex data pattern are first identified. The spacings of these patterns are then referenced into the correction table described above and the corresponding input bit pattern spacings are extracted. Finally, the series of shifted input bit patterns, now pre-compensated for the nonlinear bitshift effect, is recorded on the data recording device.

The alternative to the empirical approach is an analytical approach. The analytical approach applies in the case of a dibit recorded on a magnetic storage device, where only one bit (the second bit) shifts and that one bit can be clearly identified. In the measurement mode provided for the analytical approach, a dibit sequence is placed in a harmonic nulling data pattern and the test pattern thus formed is recorded on the data recording device. The amplitude of the "eliminated" harmonic is measured. The amount and direction of bitshift associated with the measured amplitude is determined and plotted as a compensation factor.

In general, for small bitshift δ, the amount of bitshift may be approximately determined according to an equation having the form $$|Z(kw_o)| = kw_o \delta |X(kw_o)| \quad (9)$$

where $kw_o$ is the $K^{th}$ harmonic of the fundamental frequency of the data pattern, $|Z(kw_o)|$ is the amplitude of the $k^{th}$ harmonic, which is to be eliminated, δ is the magnitude of the nonlinear bitshift, and $|X(kw_o)|$ is the amplitude of the $k^{th}$ harmonic of equally spaced transitions with frequency $w_o$. $X(kw_o)$ may be determined by separately writing equally spaced transitions (a simple periodic pattern as shown in FIG. 2), reading them back, and measuring the amplitude of the $k^{th}$ harmonic. The direction of bitshift is determined by purposely shifting the data pulses by a known amount during writing. The nonlinear bitshift either increases or decreases the known shift depending on the direction of nonlinear bitshift.

Once the amount and direction of bitshift for one dibit spacing is determined, the bits comprising the dibit sequence are shifted relative to one another and the harmonic nulling data pattern adjusted to maintain an "eliminated" harmonic, the test pattern recorded, and the amplitude of the "eliminated" harmonic measured again. The amount and direction of bitshift associated with the measured amplitude is once again determined and plotted as another compensation factor. The process is repeated until a graph of dibit spacings versus bitshift (compensation factor) is developed.

When measurement mode is thus completed, a compensation mode is provided wherein a complex data pattern is pre-compensated for expected nonlinear bitshift. According to the compensation mode, the data pattern is analyzed to identify the first transition for which nonlinear bitshift is expected, that is the first transition which is closely preceded by another transition. The spacing between the transitions is referenced into the graph of bit spacings versus bitshift and the appropriate pre-compensated bit spacing is determined therefrom. Then analysis of the data pattern proceeds to identify the next transition for which nonlinear bitshift is expected. The appropriate pre-compensation is determined for this transition, and the process repeats until pre-compensation is completed for the entire data pattern. Finally, the pre-compensated data pattern is recorded on the data recording device.

The compensation mode further provides an offset for the effects of cumulative shifts caused by multiple nearby transitions in a complex data pattern. The data pattern is analyzed and each transition is pre-compensated substantially as described above with the additional step of summing the individual effects from all preceding nearby transitions to determine the proper cumulative pre-compensation. Thus, for example, if the data pattern contains four closely spaced transitions, then the compensation mode determines and pre-compensates the expected bitshift of the second transition caused by the presence of the first transition, the third transition caused by the presence of the first and second transitions, and the fourth transition caused by the presence of the first, second and third transitions. All the separate shifts are determined by referencing the relevant transition spacing into the graph of bit spacings versus bitshift.

In addition to measurement mode and compensation mode, the analytical approach provides a check mode which evaluates and improves upon the predictive power of the equations discussed above by iterating on the measurement and compensation modes. In check mode, a pre-compensated dibit pattern is chosen and placed in a harmonic nulling data pattern such that the resultant spacing of the bit pattern within the harmonic nulling data pattern should produce an eliminated harmonic. The test pattern thus formed is recorded on the data recording device. The residual nonlinear bitshift is determined as a function of the amplitude of the "eliminated" harmonic, and the graph of dibit spacings versus bitshift is adjusted accordingly. The process may be repeated to iteratively perfect the nonlinear bitshift compensation scheme.

III. Description of the Preferred Embodiment

According to the preferred embodiment of the present invention, a magnetic storage device is chosen as the recording medium and a dibit is chosen as the problematic bit pattern. The class of harmonic eliminating data patterns calculated according to equation (8) with N=3 assumes the following general form:

1100 ... (m0's)100 ... (n0's)1100 ... (m0's)100 ...
(n0's)

where bits are separated by one clock period, a "1" indicates a transition, a "0" indicates no transition, and m and n are integer multiples of 6 (m and n include the two zeros shown in the above pattern). The pattern consists of a dibit and a single bit spaced relatively far from the dibit. The number of 0's between bits determines which harmonic is eliminated. One full period of the pattern, containing 6 1's, is shown. Since the first half and the second half of the pattern are identical, the pattern is obtained by the sum of three delayed isolated transition pairs.

Figure 4:
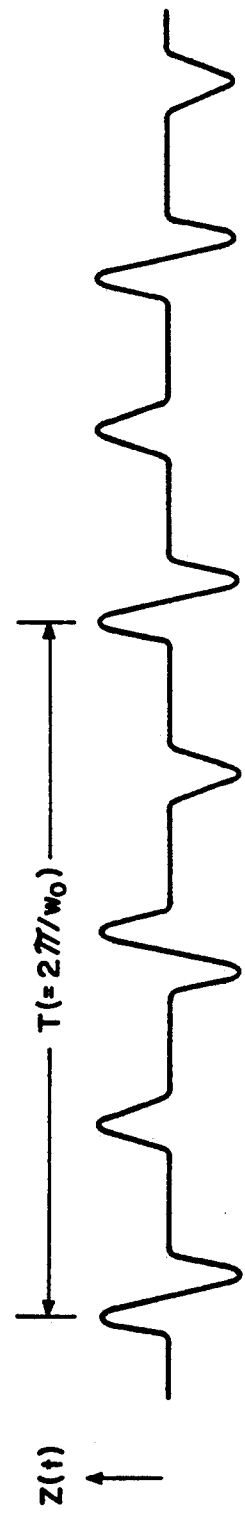
FIG. 4 is a graphical representation illustrating a readback signal of a harmonic eliminating data pattern according to the present invention.

FIG. 4 shows a qualitative representation of a typical harmonic eliminating pattern created according to the preferred embodiment. The spectrum for this pattern is:

$$Y(kw_o) = X(kw_o)(1 - e^{-j\frac{(n+1)k\pi}{m+n+3}} + e^{-j\frac{(n+2)k\pi}{m+n+3}}) \quad (10)$$

where $kw_o$ is the harmonic under consideration and $X(kw_o)$ is the amplitude of the kth harmonic of equally spaced transitions with frequency $w_o$ as shown in FIG. 2. When both m and n are multiples of 6, i.e. m=6p and n=6q, the (2p+2q+1)th harmonic is exactly zero.

The bit pattern of the preferred embodiment includes three particularly advantageous features. First, the pattern incorporates a dibit as the bit environment for which nonlinear bitshift is to be eliminated. The dibit is an ideal starting point for a compensation scheme because it forms an atomic pattern with which more complicated patterns can be analyzed. Second, when the pattern is written onto a magnetic storage surface in the presence of nonlinear bitshift, only the second bit of the dibit will undergo shifting relative to the first bit. This is advantageous because it means only one shifting bit must be dealt with in the atomic pattern. Third, the pattern is insensitive to sources of nonlinear effects other than nonlinear bitshift resulting from closely spaced databits, such as hard transition shifts, positive/negative WRITE current asymmetry, and magnetoresistive head positive/negative read asymmetry. This property is important because it enables the bit pattern to automatically remove extraneous nonlinear effects from the nonlinear bitshift elimination scheme.

As discussed in Section II, the present invention provides two alternative schemes for exploiting harmonic nulling patterns to eliminate nonlinear bitshift: an emperical approach and an analytical approach. In accordance with the preferred embodiment, the emperical approach includes a measurement mode wherein a dibit is placed in a harmonic nulling data pattern as described above and successive measurements of the "eliminated" harmonic are made corresponding to various spacings of the second bit of the dibit relative to the first bit until the harmonic to be eliminated is minimized. The process is repeated with the harmonic nulling data pattern built around a different initial dibit spacing to form a correction table of dibit spacings and corresponding input bit pattern spacings. When the measurement mode is completed, the compensation mode operates substantially as described in Section II, wherein the problematic patterns identified are dibits.

The analytical approach of the preferred embodiment includes a measurement mode wherein a dibit is placed in a harmonic nulling data pattern as described above and the amplitude of the "eliminated" harmonic is measured and used to approximately determine the magnitude and direction of nonlinear bitshift according to equation (9) in the form $$|Z(kw_o)| = kw_o \delta |X(kw_o)|.$$

The process is repeated with the harmonic nulling data pattern built around different dibit spacings to form a graph of dibit spacings versus bitshift. When the measurement mode is completed the compensation and check modes operate substantially as described in Section II.

Figure 5:
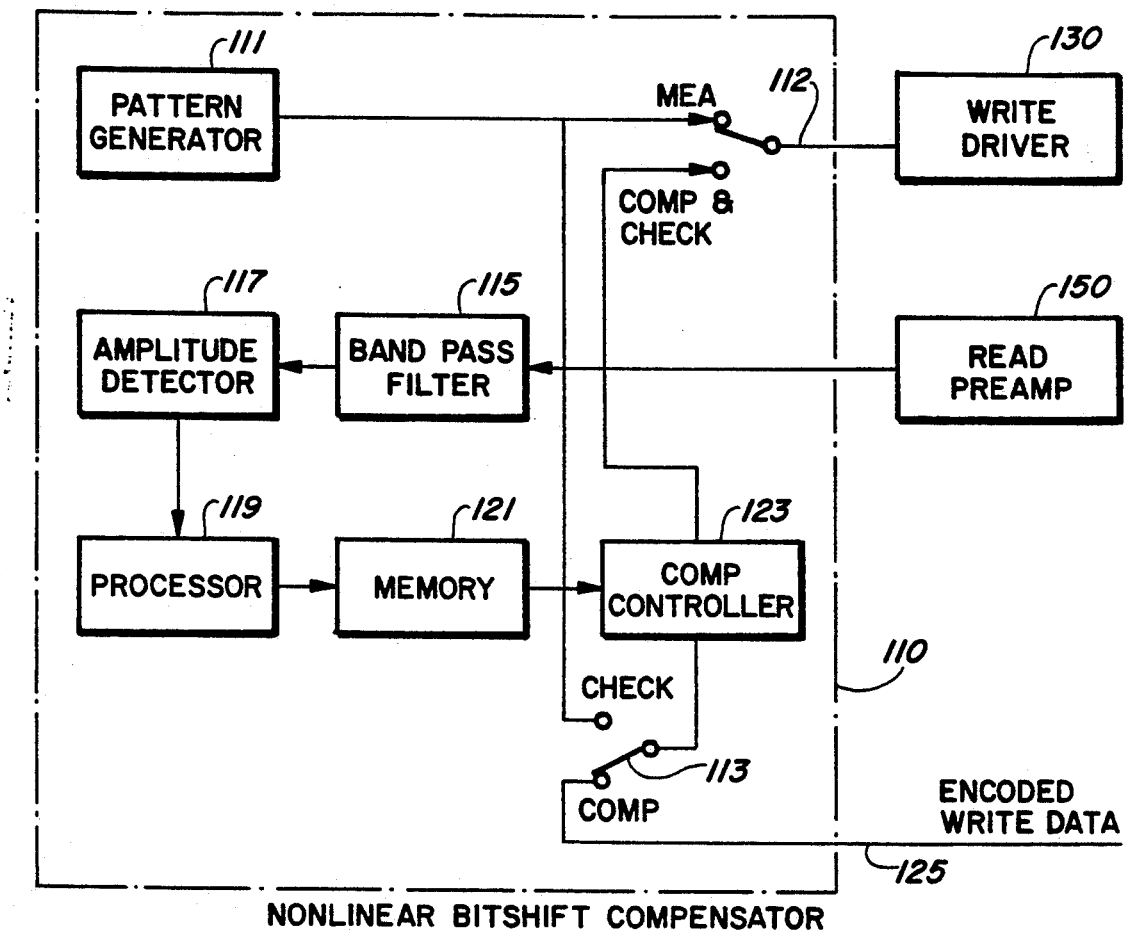
FIG. 5 is a block diagram illustrating a nonlinear bitshift compensator embodying the present invention.

FIG. 5 illustrates in block diagram form a nonlinear bitshift compensator for use in the data channel of a magnetic disk according to the preferred embodiment analytical approach for the present invention. As shown, compensator 110 includes pattern generator 111, switch 112, switch 113, bandpass filter 115, amplitude detector 117, processor 119, memory 121, and compensation controller 123.

Compensator 110 performs nonlinear bitshift measurement and pre-compensation adjustment. It has three modes at operation: MEASUREMENT, COMPENSATION, and CHECK. In MEASUREMENT mode, switch 112 connects pattern generator 111 to WRITE driver 130. Pattern generator 111 creates a data pattern having an eliminated, or nulled frequency $kw_o$, as described above. The data pattern is then written onto and read back from a storage disk (not shown) via the normal READ/WRITE channel, including WRITE driver 130 and READ preamplifier 150. The readback data pattern is fed through bandpass filter 115, which passes the nulled frequency component and removes other frequency components. The filtered signal is then fed through amplitude detector 117, which measures the magnitude of the nulled frequency component. The result is then converted into a compensation factor by processor 119 according to the method and formula of either the emperical approach or the analytical approach discussed above, and stored in memory 121 for later use by compensation controller 123. In order to implement the analytical approach a separate write-read-measure operation is required, consisting of writing an isolated transition, reading it back, and measuring the amplitude of its $k^{th}$ harmonic, $X(kw_o)$, for use in determining the magnitude of nonlinear bitshift from the magnitude of the nulled frequency component.

It is to be noted that the compensation factor stored in memory 121 may include the table of numbers described above in connection with the emperical approach, a formulaic representation of the graphical curve described above in connection with the analytical approach, a set of tables or graphs, each member of the set applicable to a particular portion of the disk, or any other information format describing a compensation approach developed according to the above-described method and formulas. Also, the contents of memory 121 may be stored permanently on a reserved part of the disk until the next calibration is performed. Further, the disk may be split into a plurality of bands, with a compensation factor calculated and stored separately for each band. Depending on the stability of disk drive components, calibration may be repeated; it can be performed after the drive is built, every time the power is turned on, every few hours, when correctable error exceeds a predetermined limit, etc. Finally, bandpass filter 115 may be implemented according to any of a variety of techniques well known in the art, including a simple inductive-capacitive network, or may be functionally combined with amplitude detector 117 in a heterodyne structure that converts the nulled frequency component to another frequency and then determines its magnitude.

In COMPENSATION mode, switch 112 connects compensation controller 123 to WRITE driver 130. Compensation controller 123 receives encoded WRITE data 125 from external circuitry. Compensation controller 123 applies the compensation factor stored in memory 121 to adjust the relative spacing of the data pulses, and then passes the data pulses to WRITE driver 130 for recording on the storage disk. The compensation provided by the spacing adjustment effectively cancels the nonlinear bitshift effect. Thus, when the recorded data is read back from the storage disk, the detection scheme can correctly anticipate the locations of the data pulses.

CHECK mode is a combination of MEASUREMENT mode and COMPENSATION mode. In CHECK mode, switch 113 connects pattern generator 111 to compensation controller 123. A data pattern from pattern generator 111 having a nulled frequency is fed into compensation controller 123 as write data. Memory 121 supplies compensation controller 123 with a previously generated compensation factor to act on the data pattern. Switch 112 connects compensation controller 123 to WRITE driver 130, and the adjusted data pattern is recorded on the storage disk. The data pattern is then read back from the storage disk using READ preamplifier 150, and the residual nonlinear bitshift is measured by bandpass filter 115, amplitude detector 117, and processor 119. The result may be used as described above, that is to indicate the effectiveness of the compensation factor and to provide further iterative modification for the compensation factor.

Figure 6:
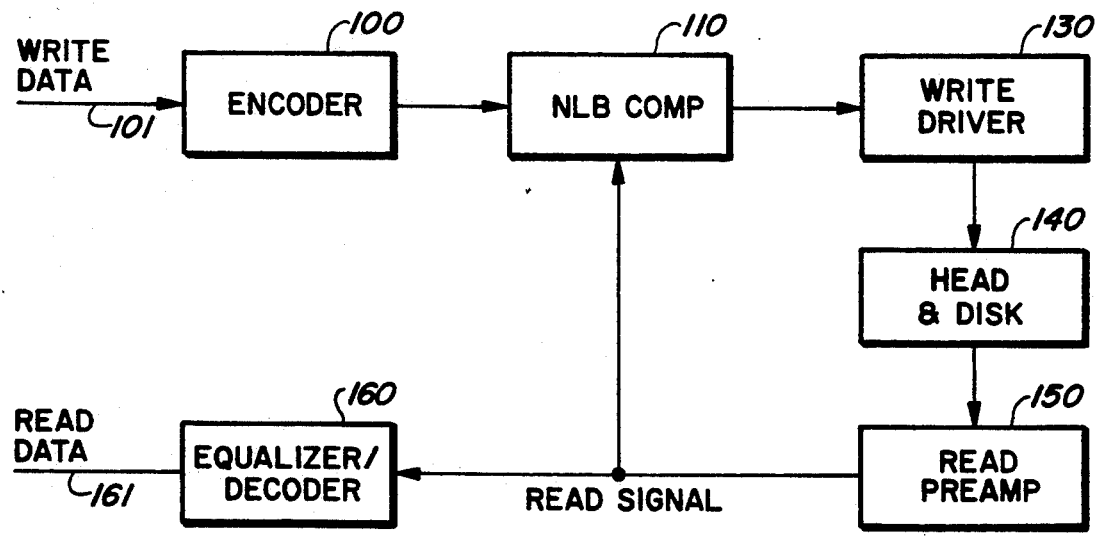
FIG. 6 is a block diagram illustrating a PRML recorded data detection scheme with compensation embodying the present invention.

FIG. 6 illustrates in block diagram form a PRML recorded data detection scheme embodying the present invention. As shown, the system includes encoder 100, nonlinear bitshift compensator 110, READ preamplifier 150, and equalizer/decoder 160.

In operation, encoder 100 receives WRITE data 101 from external circuitry and translates WRITE data 101 into a magnetically recordable pulse train. Nonlinear bitshift compensator 110 receives the encoded WRITE data and adjusts the internal spacing of the pulse train to compensate the nonlinear bitshift effect, as described above. The adjusted encoded WRITE data is then received by WRITE driver 130, which converts it into a corresponding WRITE current. The WRITE current passes through a magnetic head within recording head and storage disk 140, where it is thereby recorded on the storage disk. When the recorded data is to be read back form the storage disk, READ preamplifier 150 receives and amplifies the readback signal from the magnetic head. Equalizer/decoder 160 receives the amplified signal, decodes (i.e. detects) the pulse train, and provides at its output READ data 161 for connection to external circuitry. Since the nonlinear bitshift effect was compensated before the data was written to the storage disk, the pulses comprising the readback signal are detected at their expected locations, and the number of readback errors generated by equalizer/decoder 160 is reduced.

While the invention has been particularly described and illustrated with reference to a preferred embodiment, it will be understood by those skilled in the art that changes in the description or illustrations may be made with respect to form or detail without departing from the spirit and scope of the invention. For instance, the nonlinear communication medium to which nonlinear bitshift measurement and compensation is applied need not be a magnetic disk or an optical disk; it may be an optical fiber network or a magnetic tape system or any other system subject to nonlinear effects.

What is claimed is:

1. A data recording device having compensation for nonlinear bitshift, comprising:
   a data storage surface; and
   means for recording a data pattern on said data storage surface, said data pattern comprising a plurality of pulses having spacing approximately represented by the equation $$1 + \sum_{n=2}^{N} a_n e^{-jwT_n} = 0$$

wherein
   $a_n$ represents the polarity of the $n^{th}$ pulse,
   w represents a frequency whose component is to be eliminated,
   N represents the number of pulses in one period of said data pattern, and
   $T_n$ represents the time distance between the n-th pulse and the first pulse in said data pattern in the absence of nonlinear bitshift.

2. A data recording device having compensation for nonlinear bitshift, comprising:
   a data storage surface; and
   means for recording a data pattern on said data storage surface, said data pattern comprising a plurality of pulses having spacing approximately represented by the equation $$1 + \sum_{n=2}^{N} (-1)^{n+1} e^{-jwT_n} = 0$$

wherein
   w represents a frequency whose component is to be eliminated,
   N represents the number of pulses in one period of said data pattern, and
   $T_n$ represents the time distance between the n-th pulse and the first pulse in said data pattern in the absence of nonlinear bitshift.

3. A data recording device as recited in claim 2, further comprising:
   means for determining the magnitude of nonlinear bitshift in the recorded data pattern according to the equation $$|Z(kw_o)| = kw_o \delta |X(kw_o)|.$$

wherein $kw_o$ represents the $k^{th}$ harmonic of the fundamental frequency of said data pattern,
   $|Z(kw_o)|$ represents the amplitude of the $k^{th}$ harmonic,
   $|X(kw_o)|$ represents the amplitude of the $k^{th}$ harmonic of equally spaced transitions with frequency $w_o$, and
   $\delta$ represents the magnitude of nonlinear bitshift.

4. A data recording device having compensation for nonlinear bitshift, comprising:
   a data storage surface for receiving data;
   pattern generation means for generating a data pattern having a nulled frequency, said data pattern comprising a plurality of pulses having spacing approximately represented by the equation $$1 + \sum_{n=2}^{N} (-1)^{n+1} e^{-jwT_n} = 0$$

wherein
   w represents a frequency whose component is to be eliminated,
   N represents the number of pulses in one period of said data pattern, and
   $T_n$ represents the time distance between the n-th pulse and the first pulse in said data pattern in the absence of nonlinear bitshift;
   data READ/WRITE means for writing said data pattern onto said data storage surface and reading back said data pattern from said data storage surface;
   amplitude detector means for measuring the magnitude of the readback data pattern at said nulled frequency; and
   processor means for converting said measured magnitude into a compensation factor.

5. A data recording device as recited in claim 4, wherein said processor means includes means for determining the magnitude of nonlinear bitshift from said measured magnitude according to the equation $$|Z(kw_o)| = kw_o \delta |X(kw_o)|$$

wherein
   $kw_o$ represents the kth harmonic of the fundamental frequency of said data pattern,
   $|Z(kw_o)|$ represents the amplitude of the kth harmonic,
   $|X(kw_o)|$ represents the amplitude of the $k^{th}$ harmonic of equally spaced transitions with frequency $w_o$, and
   $\delta$ represent the magnitude of nonlinear bitshift.

6. A data recording device as recited in claim 5, wherein said pattern generation means further provides means for shifting the spacing of said pulses by a known amount and means for determining the direction of nonlinear bitshift in the readback data pattern according to the difference between the magnitude of nonlinear bitshift and said known amount of shift.

7. A data recording device as recited in claim 5, further comprising:
memory means for storing said compensation factor;
a source of WRITE data; and
compensation controller means, responsive to said compensation factor, for receiving said WRITE data, shifting the spacing of data pulses in said WRITE data in accordance with said compensation factor and transferring said compensated WRITE data to said data READ/WRITE means for recording onto said data storage surface.

8. A data recording device as recited in claim 5, further comprising:
filter means for receiving the readback data pattern and determining the amplitude of said nulled frequency component therefrom.

9. A method of measuring nonlinear bitshift in a data recording device, comprising the steps of:
generating a data pattern having a plurality of pulses with spacing described by the equation $$1 + \sum_{n=2}^{N} (-1)^{n+1} e^{-jwT_n} = 0$$

wherein
w represents a frequency whose component is to be eliminated,
N represents the number of pulses in one period of said data pattern, and
$T_n$ represents the time distance between the n-th pulse and the first pulse in said data pattern in the absence of nonlinear bitshift;
writing said data pattern onto a data storage surface;
reading back said data pattern from said data storage surface; and
determining the magnitude of nonlinear bitshift in the readback data pattern according to the equation $$|Z(kw_o)| = kw_o \delta X(kw_o)|$$

wherein
$kw_o$ represents the kth harmonic of the fundamental frequency of said data pattern,
$|Z(kw_o)|$ represents the amplitude of the $k^{th}$ harmonic,
$|X(kw_o)|$ represents the amplitude of the $k^{th}$ harmonic of equally spaced transitions with frequency $w_o$, and
$\delta$ represents the magnitude of nonlinear bitshift.

10. A method of measuring nonlinear bitshift as recited in claim 9, further comprising the steps of:
shifting the spacing of said pulses by a known amount prior to said writing step; and
determining the direction of nonlinear bitshift in the readback data pattern according to the difference between the magnitude of nonlinear bitshift and said known amount of shift.

11. A method of compensating for nonlinear bitshift in a data recording device having a data storage surface for receiving data comprising the steps of:
(1) generating a data pattern having a nulled frequency, said data pattern comprising a plurality of pulses having spacing described by the equation $$1 + \sum_{n=2}^{N} (-1)^{n+1} e^{-jwT_n} = 0$$

wherein
w represents a frequency whose component is to be eliminated,
N represents the number of pulses in one period of said data pattern, and
$T_n$ represents the time distance between the n-th pulse and the first pulse in said data pattern in the absence of nonlinear bitshift;
(2) writing said data pattern onto said data storage surface;
(3) reading back said data pattern from said data storage surface;
(4) measuring the magnitude of the readback data pattern at said nulled frequency; and
(5) converting said measured magnitude into a compensation factor.

12. A method of compensating for nonlinear bitshift as recited in claim 11, wherein said converting step includes:
(a) shifting the spacing of at least one of the pulses in said data pattern relative to the other pulses to form a shifted data pattern;
(b) writing said shifted data pattern onto said data storage surface;
(c) reading back said shifted data pattern from said data storage surface;
(d) measuring the magnitude of the readback data pattern at said nulled frequency;
(e) repeating steps (a) through (d) at least once; and retaining said data pattern and the one of said shifted data patterns having the smallest readback magnitude at said nulled frequency as said compensation factor.

13. A method of compensating for nonlinear bitshift as recited in claim 12, further comprising the steps of:
storing said compensation factor in a memory means;
receiving WRITE data from a WRITE data source; and
shifting the spacing of data pulses in said WRITE data in accordance with said compensation factor.

14. A method of compensating for nonlinear bitshift as recited in claim 12, wherein:
steps (1) to (5) are performed repetitively, each repetition operating on a different generated data pattern;
said retaining step forms a compensation table comprising the compensation factors generated by the repetition of steps (1) to (5); and
further comprising the steps of:
storing said compensation table in a memory means;
receiving WRITE data from a WRITE data source; and
shifting the spacing of data pulses in said WRITE data in accordance with said compensation table.

15. A method of compensating for nonlinear bitshift as recited in claim 14, wherein said shifting step further comprises the steps of:
subdividing said WRITE data into bit patterns having the form of a problematic pattern within said data pattern;
shifting the spacing of said bit patterns in accordance with said compensation table.

16. A method of compensating for nonlinear bitshift as recited in claim 11, wherein said converting step includes determining the magnitude of nonlinear bitshift from said measured magnitude according to the equation $$|Z(kw_o)| = kw_o \delta X(kw_o)|$$

wherein
  $kw_o$ represents the kth harmonic of the fundamental frequency of said data pattern;
  $|Z(kw_o)|$ represents the amplitude of the kth harmonic,
  $|X(kw_o)|$ represents the amplitude of the $k^{th}$ harmonic of equally spaced transitions with frequency $w_o$, and $\delta$ represents the magnitude of nonlinear bitshift.

17. A method of compensating for nonlinear bitshift as recited in claim 16, further comprising the steps of:
  storing said compensation factor in a memory means;
  receiving WRITE data from a WRITE data source; and
  shifting the spacing of data pulses in said WRITE data in accordance with said compensation factor.

18. A method of compensating for nonlinear bitshift as recited in claim 16, further comprising the step of:
  filtering the readback data pattern to determine the amplitude of said nulled frequency component.

19. A method of compensating for nonlinear bitshift as recited in claim 16, wherein:
  steps (1) to (5) are performed repetitively, each repetition operating on a different generated data pattern; and
  further comprising the steps of:
  storing the compensation factors generated by the repetition of steps (1) to (5) in a memory means;
  receiving WRITE data from a WRITE data source; and
  shifting the spacing of data pulses in said WRITE data in accordance with the compensation factors.

20. A method of compensating for nonlinear bitshift as recited in claim 19,
  wherein said shifting step further comprises the steps of:
  in said WRITE data identifying at least one shifting data pulse, where said at least one shifting data pulse is a data pulse which is closely preceded by at least one other data pulse;
  for each said at least one shifting data pulse, summing the individual effects from all nearby preceding data pulses on said at least one shifting data pulse; and
  shifting the spacing of said at least one shifting data pulse in accordance with said sum of individual effects and said compensation factors.

21. A magnetic recording device having compensation for nonlinear bitshift, comprising:
  a magnetic storage surface;
  means for recording a data pattern on aid magnetic storage surface, said data pattern comprising a plurality of pulses having spacing according to the form $$1100\ldots(m0's)100\ldots(n0's)\ 1100\ldots(m0's)100\ldots(n0's)$$

wherein m and n are integer multiples of 6;
  means for reading back the recorded data pattern from said magnetic storage surface;
  means for measuring the magnitude of nonlinear bitshift in said readback data pattern; and
  means for converting said measured magnitude into a compensation factor.

22. A magnetic recording device as recited in claim 21,
  wherein the measuring means determines the magnitude of nonlinear bitshift in said readback data pattern according to the equation $$|Z(kw_o)| = kw_o \delta X(kw_o)|$$

wherein $kw_o$ represents the $k^{th}$ harmonic of the fundamental frequency of said data pattern,
  $|Z(kw_o)|$ represents the amplitude of the $k^{th}$ harmonic,
  $|X(kw_o)|$ represents the amplitude of the $k^{th}$ harmonic of equally spaced transitions with frequency $w_o$, and
  $\delta$ represents the magnitude of nonlinear bitshift.

23. A magnetic recording device having compensation for nonlinear bitshift, comprising:
  a magnetic storage surface for receiving data;
  pattern generation means for generating a data pattern having a nulled frequency, said data pattern comprising a plurality of pulses having spacing according to the form $$1100\ldots(m0's)100\ldots(n0's)1100\ldots(m0's)100\ldots(n0's)$$

wherein m and n are integer multiples of 6;
  data READ/WRITE means for writing said data pattern onto said magnetic storage surface and reading back said data pattern from said magnetic storage surface;
  amplitude detector means for measuring the magnitude of the readback data pattern at said nulled frequency; and
  processor means for converting said measured magnitude into a compensation factor.

24. A magnetic recording device as recited in claim 23, wherein said processor means includes means for determining the magnitude of nonlinear bitshift from said measured magnitude according to the equation $$|Z(kw_o)| = kw_o \delta X(kw_o)|$$

wherein
  $kw_o$ represents the kth harmonic of the fundamental frequency of said data pattern,
  $|Z(kw_o)|$ represents the amplitude of the kth harmonic,
  $|X(kw_o)|$ represents the amplitude of the $k^{th}$ harmonic of equally spaced transitions with frequency $w_o$, and
  $\delta$ represent the magnitude of nonlinear bitshift.

25. A magnetic recording device as recited in claim 24, wherein said pattern generation means further provides means for shifting the spacing of said pulses by a known amount and means for determining the direction of nonlinear bitshift in the readback data pattern according to the difference between the magnitude of nonlinear bitshift and said known amount of shift.

26. A magnetic recording device as recited in claim 25, further comprising:

memory means for storing said compensation factor;
a source of WRITE data; and
compensation controller means, responsive to said compensation factor, for receiving said WRITE data, shifting the spacing of data pulses in said WRITE data in accordance with said compensation factor and transferring said compensated WRITE data to said data READ/WRITE means for recording onto said magnetic storage surface.

27. A magnetic recording device as recited in claim 25, further comprising:
filter means for receiving the readback data pattern and determining the amplitude of said nulled frequency component therefrom.

28. A method of measuring nonlinear bitshift in a data recording device, comprising the steps of:
generating a data pattern comprising a plurality of pulses having spacing according to the form 1100 ... (m0's)100 ... (n0's) 1100 ... (m0's)100 ... (n0's)

wherein m and n are integer multiples of 6;
writing said data pattern onto a data storage surface;
reading back said data pattern from said data storage surface;
determining a magnitude of said readback data pattern at a preselected harmonic of said data pattern, said preselected harmonic being chosen in accordance with the values of m and n; and
assigning said determined magnitude as a measure of nonlinear bitshift for the data pattern.

29. A magnetic recording device having compensation for nonlinear bitshift, comprising:
a WRITE data encoder for converting binary data into magnetically recordable form;
compensation means for receiving encoded WRITE data from said WRITE encoder adjusting the spacing of said encoded WRITE data;
a WRITE driver for receiving adjusted encoded WRITE data from said compensation means and converting said adjusted encoded WRITE data into a corresponding WRITE current;
a magnetic head and storage surface, said magnetic head receiving said WRITE data onto said magnetic storage surface;
a READ amplifier for receiving and amplifying readback data from said magnetic storage surface;
a READ data equalizer and decoder for converting a magnetically induced pulse train into binary data form;
said compensation means including
pattern generation means for generating a data pattern having a nulled frequency, said data pattern comprising a plurality of pulses having spacing according to the form 1100 ... (m0's)100 ... (n0's) 1100 ... (m0's)100 ... (n0's)

wherein m and n are integer multiples of 6; and
processor means for creating a compensation factor, said processor means including means for determining the magnitude of nonlinear bitshift when said data pattern is written to said magnetic storage surface, said magnitude of nonlinear bitshift being determined according to the equation $$|Z(kw_o)| = kw_o \delta X(kw_o)|$$

wherein
$kw_o$ represents the kth harmonic of the fundamental frequency of said data pattern,
$|Z(kw_o)|$ represents the amplitude of the kth harmonic,
$|X(kw_o)|$ represents the amplitude of the $k^{th}$ harmonic of equally spaced transitions with frequency $w_o$, and
$\delta$ represents the magnitude of nonlinear bitshift.

* * * * *

UNITED STATES PATENT AND TRADEMARK OFFICE
CERTIFICATE OF CORRECTION

PATENT NO. : 5,262,904
DATED : November 16, 1993
INVENTOR(S) : Tang et al.

It is certified that error appears in the above-indentified patent and that said Letters Patent is hereby corrected as shown below:

Column 3, equation 3, delete "equation", insert --

$$Y(w) = P(w)(1 + a_2 e^{-jwT_2} + a_3 e^{-jwT_3} + \ldots + a_N e^{-jwT_N})$$

--.

Column 3, equation 4, delete "equation", insert --

$$1 + a_2 e^{-jwT_2} + a_3 e^{-jwT_3} + \ldots + a_N e^{-jwT_N} = 0$$

--.

Column 3, equation 5, delete "equation", insert --

$$1 + \sum_{n=2}^{N} a_n e^{-jwT_n} = 0$$

--.

Column 3, equation 6, delete "equation", insert --

$$Y(w) = P(w)(1 - e^{-jwT_2} + e^{-jwT_3} - \ldots - (-1)^N e^{-jwT_N})$$

--.

Column 3, equation 8, delete "equation", insert --

$$1 + \sum_{n=2}^{N} (-1)^{n+1} e^{-jwT_n} = 0$$

--.

UNITED STATES PATENT AND TRADEMARK OFFICE
CERTIFICATE OF CORRECTION

PATENT NO. : 5,262,904

DATED : November 16, 1993

INVENTOR(S) : Tang et al.

Page 2 of 3

It is certified that error appears in the above-indentified patent and that said Letters Patent is hereby corrected as shown below:

Column 9, line 42, delete "equation", insert --

$$1 + \sum_{n=2}^{N} a_n e^{-jwT_n} = 0$$

--.

Column 9, line 63, delete "equation", insert --

$$1 + \sum_{n=2}^{N} (-1)^{n+1} e^{-jwT_n} = 0$$

--.

Column 10, line 31, delete "equation", insert --

$$1 + \sum_{n=2}^{N} (-1)^{n+1} e^{-jwT_n} = 0$$

--.

Column 11, line 27, delete " equation", insert --

$$1 + \sum_{n=2}^{N} (-1)^{n+1} e^{-jwT_n}$$

--.

Column 12, line 3, delete "equation", insert --

$$1 + \sum_{n=2}^{N} (-1)^{n+1} e^{-jwT_n} = 0$$

--.

Column 13, line 7, delete "equation", insert --

$$|Z(kw_o)| = kw_o \delta |X(kw_o)|$$

--.

UNITED STATES PATENT AND TRADEMARK OFFICE
CERTIFICATE OF CORRECTION

PATENT NO. : 5,262,904
DATED : November 16, 1993
INVENTOR(S) : Tang et al.

It is certified that error appears in the above-indentified patent and that said Letters Patent is hereby corrected as shown below:

Column 14, line 13, delete "equation", insert --

$$|Z(kw_o)| = kw_o \delta |X(kw_o)|$$

--.

Column 14, line 49, delete "equation", insert --

$$|Z(kw_o)| = kw_o \delta |X(kw_o)|$$

--.

Column 16, line 29, delete "equation", insert --

$$|Z(kw_o)| = kw_o \delta |X(kw_o)|$$

--.

Signed and Sealed this

Twenty-fifth Day of April, 1995

Attest:

BRUCE LEHMAN

Attesting Officer     Commissioner of Patents and Trademarks